United States Patent
Rodriguez (10) Patent No.: US 7,328,696 B2
(45) Date of Patent: Feb. 12, 2008

(54) QUICK ASSEMBLY GRILL

(75) Inventor: Carlos Rodriguez, Golden Valley, MN (US)

(73) Assignee: Marshall Associates, Inc., Chicago, IL (US)

(*) Notice: Subject to any disclaimer, the term of this patent is extended or adjusted under 35 U.S.C. 154(b) by 113 days.

(21) Appl. No.: 11/124,802

(22) Filed: May 9, 2005

(65) Prior Publication Data

US 2005/0247299 A1 Nov. 10, 2005

Related U.S. Application Data (60) Provisional application No. 60/569,314, filed on May 8, 2004, provisional application No. 60/569,125, filed on May 7, 2004.

(51) Int. Cl.
 *F24C 5/00* (2006.01)
(52) U.S. Cl. .......................... 126/50; 126/30
(58) Field of Classification Search .............. 126/30, 126/50; 248/150, 151, 152
See application file for complete search history.

(56) References Cited

U.S. PATENT DOCUMENTS

| | | | |
|---|---|---|---|
| 101,777 A | 3/1870 | Stevenson |
| RE4,652 E | 11/1871 | Roe |
| 479,652 A | 7/1892 | Marcee |
| 678,024 A | 7/1901 | Norpis |
| 758,472 A | 4/1904 | Reams |
| 1,055,311 A | 3/1913 | Blount |
| D44,522 S | 8/1913 | Curtiss |
| 1,157,713 A | 10/1915 | Morrow |
| 1,394,228 A | 10/1921 | Sheridan |
| 1,460,928 A | 7/1923 | Tilden |
| 1,462,578 A | 7/1923 | Kashinsky |
| 1,596,367 A | 8/1926 | Miller |
| 1,603,741 A | 10/1926 | Bridler |
| 1,783,183 A | 12/1930 | Dibble |
| 2,032,221 A | 2/1936 | Myers |
| 2,182,663 A | 12/1939 | Eby et al. |
| 2,235,479 A | 3/1941 | Gough |
| 2,274,433 A | 2/1942 | Schulz |
| 2,314,791 A | 3/1943 | Jones |
| 2,347,980 A | 5/1944 | Apfelbaum |
| D139,850 S | 12/1944 | Frenning |
| 2,431,905 A | 12/1947 | Anicetti |
| 2,511,594 A | 6/1950 | Loffredo |
| 2,512,223 A | 6/1950 | Contiguglia |

(Continued)

OTHER PUBLICATIONS

Meco Owner's Manual, copyright 1995, "Meco Swinger Grill".

(Continued)

*Primary Examiner*—Alfred Basichas
(74) *Attorney, Agent, or Firm*—McAndrews, Held & Malloy, Ltd.

(57) ABSTRACT

Certain embodiments of the present invention provide a grill including a quick assembly system. In an embodiment, a grill including a quick assembly system includes two side support frames and a side support frame connector. The grill may also include two cross side supports and a base support frame, for example. The grill may also include: a bowl, a lid, a side shelf, an ash catcher, a charcoal grate, grate height adjusters, a cooking grate, a warming rack, a hinge, a vent, a handle, wheels, and/or leg extensions, for example.

5 Claims, 6 Drawing Sheets

U.S. PATENT DOCUMENTS

| | | |
|---|---|---|
| D163,090 S | 5/1951 | Campbell |
| D165,497 S | 12/1951 | Waas |
| D165,998 S | 2/1952 | Pollard |
| 2,600,234 A | 6/1952 | Foley |
| 2,621,586 A | 12/1952 | Roney |
| 2,641,243 A | 6/1953 | Goss |
| 2,666,425 A | 1/1954 | Hasting, Jr. |
| D171,639 S | 3/1954 | Clemens, Jr. |
| 2,728,334 A | 12/1955 | Paolella |
| 2,746,378 A | 5/1956 | Lang |
| D179,345 S | 12/1956 | Henry |
| 2,780,392 A | 2/1957 | Nonhof |
| 2,787,995 A | 4/1957 | Alter |
| D184,732 S | 3/1959 | Heyer |
| 2,886,386 A | 5/1959 | Spitzer |
| 2,920,614 A | 1/1960 | Phelps |
| 2,932,479 A | 4/1960 | Leach |
| D188,879 S | 9/1960 | Gauss et al. |
| D189,682 S | 1/1961 | Bloomfield |
| 3,008,175 A | 11/1961 | Biedinger et al. |
| D192,199 S | 2/1962 | Watson et al. |
| 3,025,848 A | 3/1962 | Malgesini |
| D193,163 S | 7/1962 | Levi |
| 3,046,970 A | 7/1962 | Seaman |
| 3,073,263 A | 1/1963 | Wynkoop |
| D196,552 S | 10/1963 | Mayer |
| D196,996 S | 11/1963 | Kates |
| 3,111,337 A | 11/1963 | Kates |
| 3,126,881 A | 3/1964 | Blotsky Jr. |
| D198,822 S | 8/1964 | Lyemance |
| D200,137 S | 1/1965 | Hanna |
| 3,167,642 A | 1/1965 | Reis |
| 3,200,806 A | 8/1965 | Goldstein |
| 3,209,743 A | 10/1965 | Stewart et al. |
| 3,216,379 A | 11/1965 | Durfee |
| 3,217,634 A | 11/1965 | Fox |
| 3,276,440 A | 10/1966 | Sazegar |
| D207,567 S | 5/1967 | Helgeson |
| D208,179 S | 7/1967 | King et al. |
| 3,330,266 A | 7/1967 | Stephen |
| 3,380,444 A | 4/1968 | Stalker |
| 3,385,281 A | 5/1968 | O'Russa |
| D211,919 S | 8/1968 | Harff et al. |
| D214,220 S | 5/1969 | Ver Halen |
| 3,453,975 A | 7/1969 | Gunter |
| D215,250 S | 9/1969 | McClaren |
| 3,499,399 A | 3/1970 | Kaufmann |
| 3,500,812 A | 3/1970 | Korngold |
| 3,520,290 A | 7/1970 | Winters |
| 3,533,393 A | 10/1970 | Haapanen |
| 3,538,906 A | 11/1970 | Heraty et al. |
| D219,413 S | 12/1970 | Glaser |
| D219,629 S | 12/1970 | Koziol |
| D219,693 S | 1/1971 | Hahn |
| 3,567,065 A | 3/1971 | Dinse |
| D222,311 S | 10/1971 | Wilkinson et al. |
| 3,611,910 A | 10/1971 | Hughes |
| 3,611,915 A | 10/1971 | Glaser |
| 3,617,022 A | 11/1971 | Wiggins |
| D223,042 S | 2/1972 | Wilkinson et al. |
| 3,638,634 A | 2/1972 | Bolitho |
| 3,683,791 A | 8/1972 | Rast |
| 3,688,758 A | 9/1972 | Stephen, Jr. |
| 3,714,937 A | 2/1973 | Linstead |
| 3,734,076 A | 5/1973 | Kiziol |
| D227,643 S | 7/1973 | Koziol |
| 3,759,164 A | 9/1973 | Robinson |
| D229,625 S | 12/1973 | Thomas |
| D229,660 S | 12/1973 | Gammon |
| 3,785,275 A | 1/1974 | Keats et al. |
| 3,791,368 A | 2/1974 | Hunt |
| D231,070 S | 4/1974 | Koziol |
| 3,806,987 A | 4/1974 | Koziol |
| 3,812,840 A | 5/1974 | Whaler |
| D231,892 S | 6/1974 | Warshauer |
| 3,822,456 A | 7/1974 | Petruzzi |
| 3,841,299 A | 10/1974 | Tomita |
| D233,585 S | 11/1974 | Thomas |
| 3,865,052 A | 2/1975 | Streets et al. |
| D237,578 S | 11/1975 | Thomas |
| 3,974,821 A | 8/1976 | Storandt |
| 3,981,292 A | 9/1976 | Lilly et al. |
| D243,309 S | 2/1977 | Reunanen |
| 4,008,971 A | 2/1977 | Wah et al. |
| 4,034,662 A | 7/1977 | McLane |
| 4,083,641 A | 4/1978 | Sado |
| D250,317 S | 11/1978 | Simmons |
| D251,230 S | 3/1979 | Adams |
| D252,248 S | 7/1979 | Huff |
| 4,192,283 A | 3/1980 | Kridler |
| 4,209,006 A | 6/1980 | Marsalko |
| D255,863 S | 7/1980 | Futch |
| 4,227,510 A | 10/1980 | Frazier et al. |
| 4,273,096 A | 6/1981 | Hannebaum |
| 4,281,633 A | 8/1981 | Wackerman |
| 4,302,181 A | 11/1981 | Schlosser |
| 4,331,123 A | 5/1982 | Alles et al. |
| 4,331,127 A | 5/1982 | Grosso |
| 4,332,188 A | 6/1982 | Rhear |
| 4,332,235 A | 6/1982 | Hannebaum |
| 4,337,751 A | 7/1982 | Sampson et al. |
| 4,340,027 A | 7/1982 | Fuss |
| 4,353,347 A | 10/1982 | Seed |
| 4,362,093 A | 12/1982 | Griscom |
| 4,382,432 A | 5/1983 | Lizdas |
| 4,390,002 A | 6/1983 | Daily, III |
| D269,758 S | 7/1983 | Braswell |
| D269,839 S | 7/1983 | Givens, III |
| D270,988 S | 10/1983 | Anderson |
| 4,453,530 A | 6/1984 | Schlosser |
| 4,458,585 A | 7/1984 | Erbach |
| 4,463,746 A | 8/1984 | Knuth et al. |
| 4,498,452 A | 2/1985 | Schlosser et al. |
| D278,021 S | 3/1985 | Schlosser et al. |
| 4,510,916 A | 4/1985 | Ogden |
| 4,523,574 A | 6/1985 | Schlosser |
| D279,537 S | 7/1985 | Taylor et al. |
| D280,282 S | 8/1985 | Erbach |
| 4,535,749 A | 8/1985 | Schlosser |
| 4,553,524 A | 11/1985 | Wheat et al. |
| D282,619 S | 2/1986 | Fitzgerald et al. |
| 4,567,876 A | 2/1986 | Ogden |
| 4,576,140 A | 3/1986 | Schlosser |
| 4,593,676 A | 6/1986 | Wackerman |
| D284,929 S | 8/1986 | Schlosser et al. |
| 4,603,679 A | 8/1986 | Ogden |
| 4,630,593 A | 12/1986 | Gremillion |
| 4,635,613 A | 1/1987 | Tucker et al. |
| 4,667,916 A | 5/1987 | Richards |
| 4,677,964 A | 7/1987 | Lohmeyer et al. |
| 4,683,866 A | 8/1987 | Bales et al. |
| 4,688,541 A | 8/1987 | Stephen et al. |
| D291,855 S | 9/1987 | Erbach et al. |
| 4,699,120 A | 10/1987 | Ogden |
| D293,067 S | 12/1987 | Stephen et al. |
| D293,191 S | 12/1987 | Stephen et al. |
| 4,718,399 A | 1/1988 | Shephard |
| 4,727,853 A | 3/1988 | Stephen et al. |
| D295,135 S | 4/1988 | Ogden |
| 4,735,390 A | 4/1988 | Richards |
| 4,741,322 A | 5/1988 | Lin |
| 4,762,114 A | 8/1988 | Blankemeyer |
| 4,763,640 A | 8/1988 | Schnack et al. |
| 4,777,927 A | 10/1988 | Stephen et al. |

| | | |
|---|---|---|
| D298,406 S | 11/1988 | Stephen et al. |
| 4,793,580 A | 12/1988 | Richards |
| D299,690 S | 2/1989 | Schnack et al. |
| 4,829,978 A | 5/1989 | Schlosser et al. |
| D301,673 S | 6/1989 | Ogden |
| 4,836,179 A | 6/1989 | Schlosser et al. |
| D302,641 S | 8/1989 | Elmburg |
| 4,860,724 A | 8/1989 | Schlosser et al. |
| 4,924,845 A | 5/1990 | Johnson et al. |
| 4,926,841 A | 5/1990 | Woolf |
| 4,941,817 A | 7/1990 | Schlosser |
| 4,942,862 A | 7/1990 | Alden et al. |
| 4,966,125 A | 10/1990 | Stephen et al. |
| 4,966,126 A | 10/1990 | Wu |
| 4,984,515 A * | 1/1991 | Pivonka .................... 99/449 |
| D315,079 S | 3/1991 | Jui-Yen |
| D316,355 S | 4/1991 | Stephen et al. |
| 5,016,607 A | 5/1991 | Doolittle et al. |
| 5,027,788 A | 7/1991 | Schlosser |
| 5,036,832 A | 8/1991 | Schlosser et al. |
| 5,044,265 A | 9/1991 | Janssen |
| 5,069,196 A | 12/1991 | Schlosser et al. |
| 5,076,252 A | 12/1991 | Schlosser et al. |
| D322,909 S | 1/1992 | Parent et al. |
| 5,080,313 A | 1/1992 | Byrum et al. |
| D325,315 S | 4/1992 | Parent et al. |
| D325,316 S | 4/1992 | Parent et al. |
| D325,318 S | 4/1992 | Parent et al. |
| 5,111,802 A | 5/1992 | Lin |
| D327,390 S | 6/1992 | Schlosser et al. |
| D327,805 S | 7/1992 | Parent et al. |
| 5,159,917 A | 11/1992 | Archer et al. |
| 5,165,385 A | 11/1992 | Doolittle et al. |
| 5,213,075 A | 5/1993 | Stephen et al. |
| 5,299,553 A | 4/1994 | Giebel et al. |
| 5,323,758 A * | 6/1994 | Minshall et al. .......... 126/25 R |
| D350,668 S | 9/1994 | Giebel et al. |
| D351,308 S | 10/1994 | Pai |
| D352,865 S | 11/1994 | Pai |
| D355,566 S | 2/1995 | Stephen et al. |
| 5,394,590 A | 3/1995 | Yu |
| D356,924 S | 4/1995 | Pai |
| 5,452,707 A * | 9/1995 | Harris et al. ............. 126/41 R |
| 5,566,606 A | 10/1996 | Johnston |
| 5,572,983 A | 11/1996 | Schlosser et al. |
| D376,510 S | 12/1996 | Ting |
| 5,640,949 A | 6/1997 | Smith |
| D381,557 S | 7/1997 | Bradley et al. |
| D381,860 S | 8/1997 | Chiang |
| 5,749,354 A | 5/1998 | Lin |
| D395,785 S | 7/1998 | Lin |
| 5,794,608 A | 8/1998 | Von Berg |
| 5,806,510 A | 9/1998 | Fischer et al. |
| 5,809,991 A | 9/1998 | Pai |
| D404,963 S | 2/1999 | Schlosser et al. |
| 5,865,099 A | 2/1999 | Waugh |
| D409,436 S | 5/1999 | Smith |
| D412,086 S | 7/1999 | Bossler |
| 5,941,229 A * | 8/1999 | Schlosser et al. .......... 126/41 R |
| D414,374 S | 9/1999 | Ting |
| D414,980 S | 10/1999 | Pai |
| D415,649 S | 10/1999 | Pai |
| D415,653 S | 10/1999 | Schlosser et al. |
| D415,925 S | 11/1999 | Pai |
| D417,362 S | 12/1999 | Ting |
| 6,000,389 A | 12/1999 | Alpert |
| D420,546 S | 2/2000 | Pai |
| 6,041,478 A | 3/2000 | Martin |
| D426,101 S | 6/2000 | Pai |
| D426,419 S | 6/2000 | Kuo |
| D427,840 S | 7/2000 | Pai |
| D428,760 S | 8/2000 | Huang |
| D430,717 S | 9/2000 | Alden et al. |
| D435,387 S | 12/2000 | Pai |
| 6,155,248 A | 12/2000 | Schlosser et al. |
| D435,998 S | 1/2001 | Mak |
| D437,177 S | 2/2001 | Giebel et al. |
| 6,182,559 B1 | 2/2001 | Chiang |
| 6,230,700 B1 | 5/2001 | Daniels et al. |
| 6,357,434 B1 | 3/2002 | Bossler |
| 6,363,925 B1 | 4/2002 | Chavana, Jr. et al. |
| D460,657 S | 7/2002 | Bossler |
| D461,360 S | 8/2002 | Bossler |
| 6,439,221 B1 | 8/2002 | Ward et al. |
| D462,563 S | 9/2002 | Bossler |
| D463,707 S | 10/2002 | Bossler |
| D463,708 S | 10/2002 | Bossler |
| D463,709 S | 10/2002 | Bossler |
| D464,227 S | 10/2002 | Eisinger et al. |
| D464,524 S | 10/2002 | Pai |
| D464,529 S | 10/2002 | Eisinger et al. |
| 6,474,327 B1 | 11/2002 | Bossler |
| D466,359 S | 12/2002 | Bossler et al. |
| D466,756 S | 12/2002 | Bossler et al. |
| D471,396 S | 3/2003 | Chiang |
| 6,557,546 B1 | 5/2003 | Gibbons |
| D476,189 S | 6/2003 | Bossler |
| D478,462 S | 8/2003 | Zhu |
| 6,626,090 B2 | 9/2003 | McLemore et al. |
| D480,906 S | 10/2003 | Pai |
| D481,256 S | 10/2003 | Bossler |
| D482,561 S | 11/2003 | Yeh |
| D485,116 S | 1/2004 | Kwok |
| 6,684,876 B2 | 2/2004 | Bossler |
| D496,821 S | 10/2004 | Pai |
| D497,281 S | 10/2004 | Pai |
| 6,805,113 B2 * | 10/2004 | Stephen et al. .......... 126/25 R |
| 2002/0189604 A1 * | 12/2002 | McKenzie .................... 126/30 |
| 2004/0065312 A1 * | 4/2004 | Choi et al. ................ 126/25 R |

OTHER PUBLICATIONS

Merchandising, vol. 6, Jan. 1981, p. 113, "Structo Barbecue Grill".

* cited by examiner

QUICK ASSEMBLY GRILL

RELATED APPLICATION

This application claims priority to U.S. provisional application No. 60/569,125 filed May 7, 2004 and U.S. provisional application No. 60/569,314 filed May 8, 2004.

BACKGROUND OF THE INVENTION

The present invention generally relates to a grill including a quick assembly system and a method for assembling a grill. More particularly, the present invention relates to a grill including a quick assembly system and a method for assembling a grill that reduce the burden of grill assembly and allow a purchaser to assemble a grill with minimal aid.

Grills are offered in many markets, including the United States. After grills are manufactured, they are distributed to target markets so that they may be purchased by customers. Distribution of unassembled grills is often more economical and easier. Once inventory reaches its destination, there is usually not room and/or time to assemble the grills before selling them. Further, many purchasers of grills do not have the means to transport an assembled grill. Thus, many grills require manual assembly by the purchaser.

Grill assembly has been a time consuming and frustrating exercise for many purchasers. Often, grill assembly takes hours, requires the effort of multiple people and may require the purchase of tools not included with the grill. This poses a problem for those that are short on time, do not possess required tools and/or are forced to assemble a grill unaided.

Thus, there is a need for an improved grill including a quick assembly system and a method for assembling a grill that reduce the burden of grill assembly and allow a purchaser to assemble a grill with minimal aid.

BRIEF SUMMARY OF THE INVENTION

Certain embodiments of the present invention provide a grill including a quick assembly system. In an embodiment, a grill including a quick assembly system includes two side support frames and a side support frame connector. The grill may also include two cross side supports and a base support frame, for example. The grill may also include: a bowl, a lid, a side shelf, an ash catcher, a charcoal grate, grate height adjusters, a cooking grate, a warming rack, a hinge, a vent, a handle, wheels, and/or leg extensions, for example.

In an embodiment, a method for assembling a grill includes: providing two side support frames, providing a side support frame connector, and attaching the side support frame connector to the side support frames. The method may also include: providing two side support frames with cross side supports, providing a base support frame, and positioning the base support frame on the cross side supports, for example. The method may also include: attaching a bowl to the side support frames, attaching a lid to the bowl, attaching a hinge to the bowl and lid, attaching a shelf to a side support frame, positioning an ash catcher underneath the bowl, positioning a charcoal grate inside the bowl, positioning grate height adjusters on the charcoal grate, positioning a cooking grate on the grate height adjusters, attaching a warming rack to the lid and/or bowl, attaching a vent to the lid, attaching a handle to the lid, attaching wheels to a side support frame, and/or attaching leg extensions to a side support frame, for example.

DETAILED DESCRIPTION OF CERTAIN EMBODIMENTS

Figure 1:
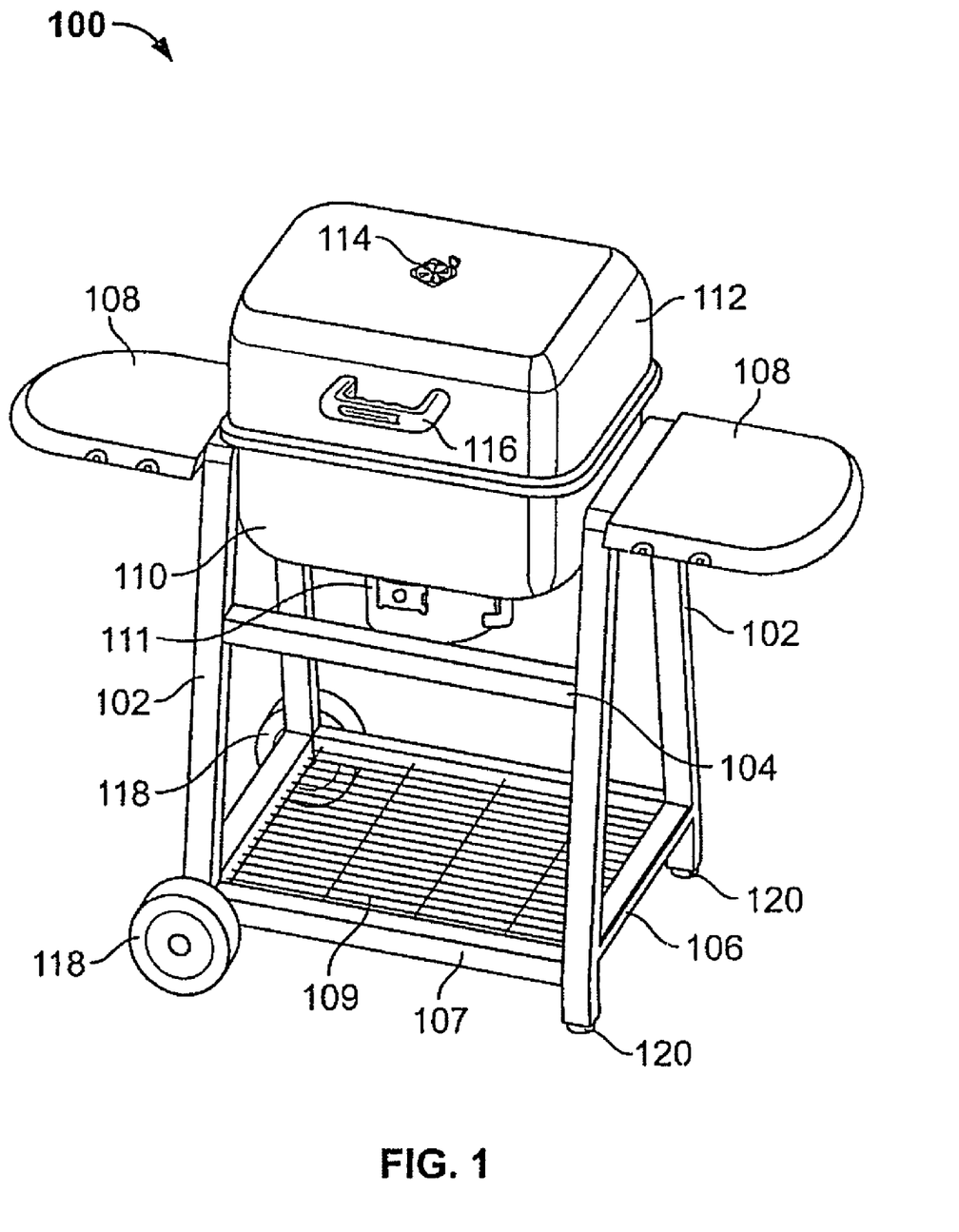
FIG. 1 is a perspective view of a grill including a quick assembly system used in accordance with an embodiment of the present invention.

FIG. 1 is a perspective view of a grill 100 including a quick assembly system used in accordance with an embodiment of the present invention. The grill 100 includes: side support frames 102, a side support frame connector 104, cross side supports 106, a base support frame 107, side shelves 108, a bottom shelf 109, a bowl 110, an ash catcher 111, a lid 112, a vent 114, a handle 116, wheels 118, and leg extensions 120.

In the grill 100, the side support frames 102 are connected to the side support frame connector 104. Each side support frame 102 preferably includes a cross side support 106. The base support frame 107 is positioned on top of the cross side supports 106 and in contact with the side support frame 102. The bottom shelf 109 is positioned on top of the base support frame. Each side shelf 108 is connected to one of the side support frames 102. The bowl 110 is also connected to the side support frames 102. The ash catcher 111 is positioned underneath the bowl 110. The lid 112 is positioned on top on the bowl 110 and rests on a ledge on the bottom of the bowl 110. The vent 114 is installed in the lid 112. The handle 116 is connected to the lid 112. The two wheels 118 are connected to one of the side support frames 102. The leg extensions 120 are connected to the side support frame 102 that is not connected to the wheels 118.

In the grill 100, the side support frames 102, the cross side supports 106, the side support frame connector 104, and the base support frame 107 operate when connected to provide a base for the grill 100. The side support frames 102 are aligned vertically, as shown in FIG. 1. The side support frames 102 are positioned on end portions, so that the side support frames 102 are substantially parallel to each other and substantially perpendicular to a horizontal surface, such as the floor. Each cross side support 106 is preferably welded to a side support frame 102 so that the cross side support 106 is substantially parallel to the horizontal surface when the side support frame 102 is positioned on the horizontal surface. The side support frame connector 104 is connected to both of the side support frames 102 and is preferably positioned so that the side support frame connector 104 is substantially parallel to the horizontal surface. The side support frame connector 104 is sized to maintain a desired distance between the side support frame 102 so as to accommodate the grill body as shown in FIG. 1. The base support frame 107 is positioned on top of the cross side supports 106 such that the base support frame is substantially parallel to the horizontal surface as shown in FIG. 1. Additionally, the base support frame 107 preferably includes cross supports (as discussed later with regard to FIG. 9) that preferably contact the sides of the side support frame 102. The side support frame connector 104 and the base support frame 107 are preferably secured to the side support frames 102 with threaded bolts as shown in more detail in FIG. 5.

Figure 6:
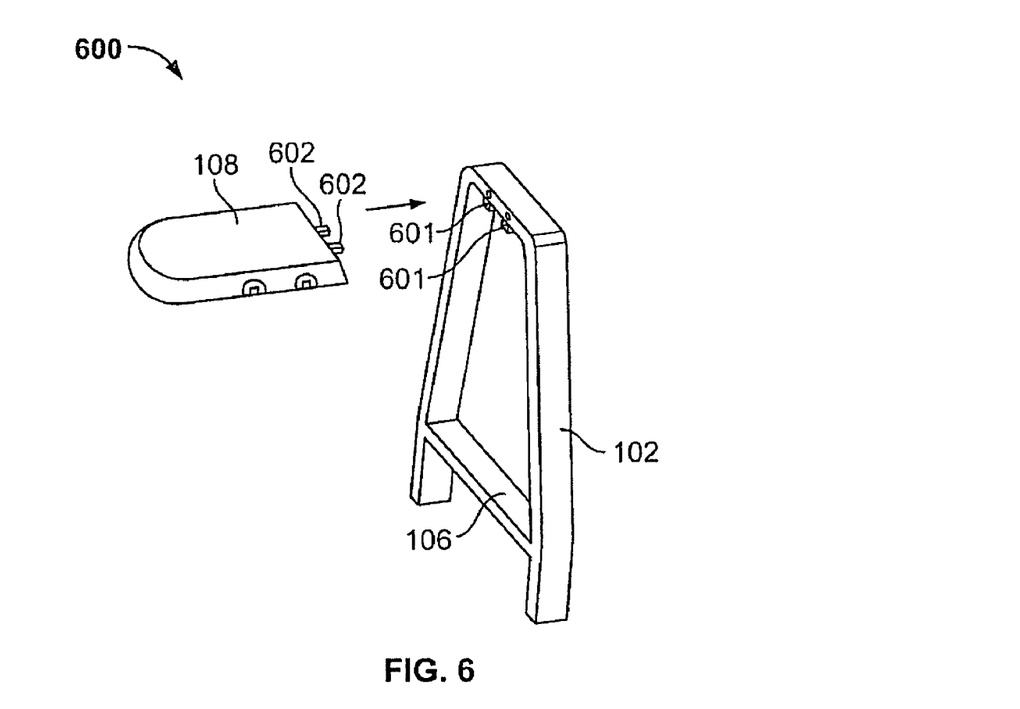
FIG. 6 is an exploded view of a side support frame and a side shelf used in accordance with an embodiment of the present invention.
Figure 7:
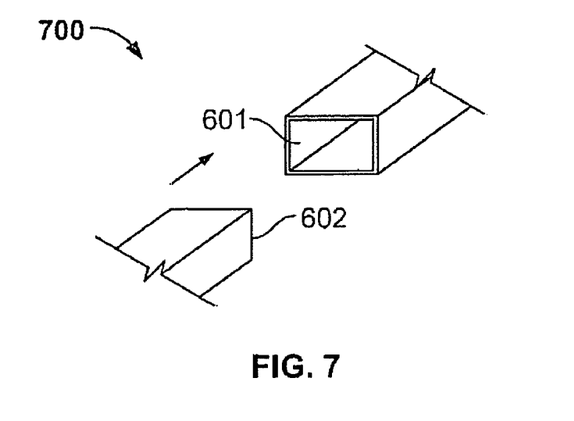
FIG. 7 is an exploded view of the side shelf support tab and the side shelf support tab aperture shown in FIG. 6.
Figure 8:
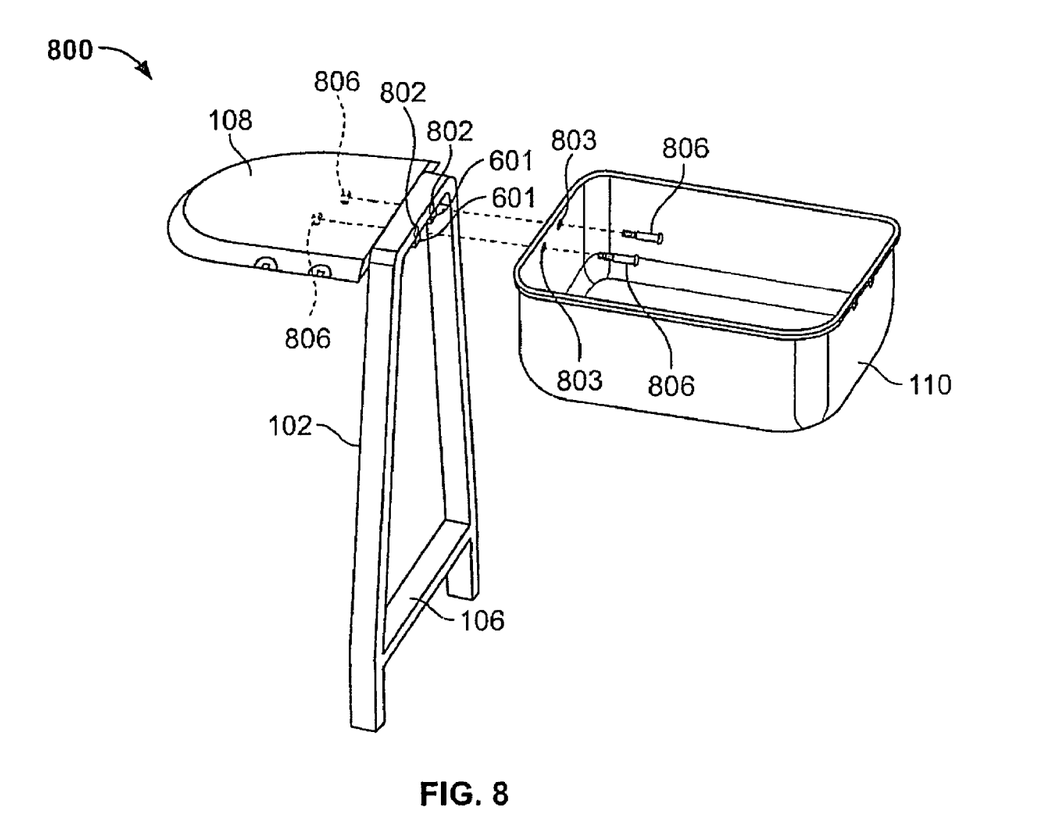
FIG. 8 is an exploded view of a side support frame, a side shelf, and a bowl used in accordance with an embodiment of the present invention.

In the grill 100, side shelves 108, bowl 110, wheels 118, and leg extensions 120 are connected to the side support frames 102. Further, detail with regard to the connection of the side shelves 108 to the side support frame 102 is shown in FIGS. 6-8. The side shelves 108 provide a supported surface for the convenience of a user of the grill 100. For example, the side shelves 108 may provide support for miscellaneous items that someone may want accessible while grilling. The side shelves 108 are preferably composed of heat-resistant material, such as plastic or metal.

The grill 100 includes a contained grilling portion, which is disclosed as the expanse enclosed by the bowl 110 and the lid 112 when the lid is positioned on top of the bowl 110. Thus, the bowl 110 provides a lower portion of the contained grilling area. The bowl 110 is preferably connected and secured to the side support frames 102 as shown in more detail in FIG. 8.

The wheels 118 are secured to one of the side support frames 102 using a threaded axle and nut set (not shown) that passes through holes (402 in FIG. 4) in a lower portion of the side support frame 102. The wheels 118 may assist a user in more easily re-positioning the grill 100.

The leg extensions 120 attach to the end portions of a side support frame 102, allowing the length of the side support frame 102 to be extended to compensate for the extra height resulting from the addition of the wheels 118.

In the grill 100, the ash catcher 111 and the lid 112 are positioned underneath and above the bowl 110, respectively. The ash catcher 111 is positioned underneath the bowl 110 as shown in U.S. patent application Ser. No. 10/791,253, published as 20040168581 on Sep. 2, 2004. The ash catcher 111 provides a receptacle for expended charcoal and other waste produced when grilling.

The lid 112 provides an upper portion of a contained grilling area. The lid 112 is positioned above the bowl 110 and attached to the bowl 110 using a hinge (not shown). The hinge is attached to the lid 112 and the bowl 110 using threaded bolt and nut sets (not shown). The hinge allows the lid 112 to be rotated between a closed position (as shown in FIG. 1) and various open positions (not shown). The hinge itself may include three parts: a top half attachable to the lid 112, a bottom half attachable to the bowl 110, and a threaded bolt that passes through holes in the top half of the hinge and the bottom half of the hinge and is secured by a nut to create an axis about which the lid 112 rotates.

In the grill 100, the vent 114 and handle 116 are connected to the lid 112. The vent 114 is connected to the lid 112 using a threaded bolt and nut set (not shown). The vent 114 provides for airflow variation through a contained grilling area created when the lid 112 is in the closed position (as shown in FIG. 1).

The handle 116 is attached to the lid 112 using screws (not shown). The screws pass through holes in the side of the lid 112 and engage the handle 116. The handle 116 provides for rotation of the lid 112 between a closed position (as shown in FIG. 1) and various open positions (not shown).

In the grill 100, the bottom shelf 109 is positioned on top of the base support frame 107. The bottom shelf is used to support miscellaneous items that someone may want accessible while grilling.

In an alternative embodiment, a grill may only have one side shelf 108.

In an alternative embodiment, a side shelf 108 may be made of any rigid material that can withstand the heat created by the grilling area.

In an alternative embodiment, side support frames 102, cross side supports 106, a side support frame connector 104, and/or a base support frame 107 may provide a base for a non-charcoal grill.

Figure 2:
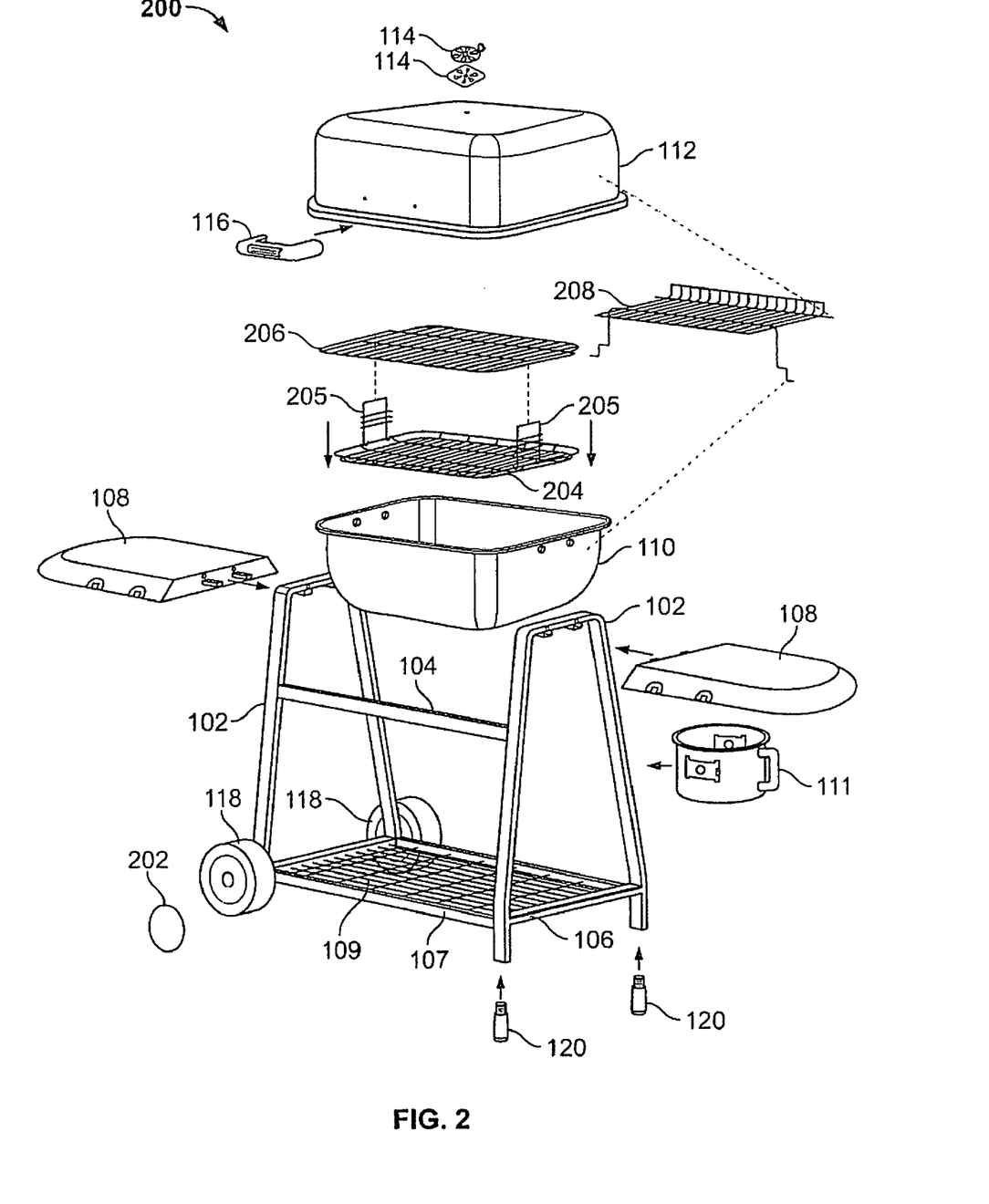
FIG. 2 is a partially exploded view of the grill shown in FIG. 1.

FIG. 2 is a partially exploded view of the grill 200 shown in FIG. 1. The gill 200 includes all of the parts described with regard to FIG. 1 and further includes: a hubcap 202, a cooking grate 204, grate height adjusters 205, a cooking grate 206, and a warming rack 208.

In the grill 200, the hubcap 202 is connected to the wheel. The charcoal grate 204 is positioned in the bowl 110. The grate height adjusters 205 are positioned on the charcoal grate 204. The cooking grate is positioned on the grate height adjusters 205. The warming rack 208 is connected to the bowl 110 and the lid 112.

In the grill 200, the hubcap 202 is connected to the wheel by pushing pins (not shown) that protrude from the hub cap 202 through holes (not shown) in the wheels 118. The hubcap 202 provides a cover for the wheels 118.

The charcoal grate 204 is positioned in a bottom portion of the bowl 110. The bottom portion of the bowl 110 is any position at or above the bottom of the bowl that is below the cooking grate 206. The charcoal grate 204 provides support for charcoal.

The grate height adjusters 205 are positioned on the charcoal grate 204. The grate height adjusters 205 provide separation between the charcoal grate 204 and the cooking grate 206. The grate height adjusters 205 provide various settings that allow the distance between the charcoal grate 204 and the cooking grate 206 to be adjusted.

The cooking grate 206 is positioned on the grate height adjusters 205 in an upper portion of the bowl 110. The upper portion of the bowl 110 is any portion at or below the bowl opening that is above the charcoal grate 204. The cooking grate 206 provides support for anything that is to be cooked.

The warming rack 208 is connected to the bowl 110 and the lid 112. The warming rack is positioned between the cooking grate 206 and the top of the lid 112. The warming rack 208 provides support for anything that is to be cooked.

Figure 3:
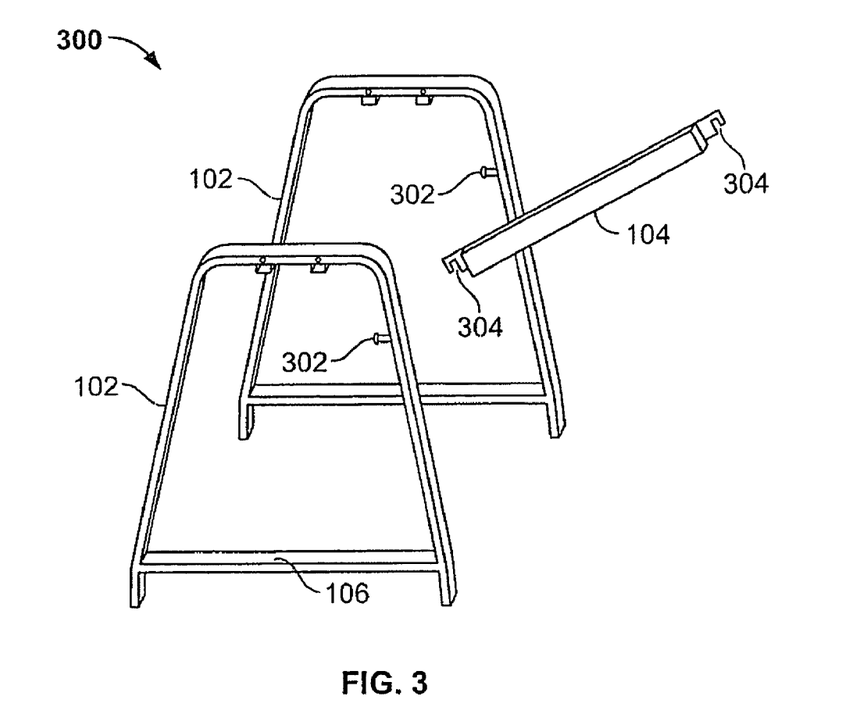
FIG. 3 is an exploded view of two side support frames and a side support frame connector positioned in accordance with an embodiment of the present invention.

FIG. 3 is an exploded view of two side support frames 102 and a side support frame connector 104 positioned in accordance with an embodiment of the present invention. In FIG. 3, the side support frames 102 and the side support frame connector 104 are connectable using a tab 302 on each side support frame 102 and corresponding tab receivers 304 on the side support connector 104.

In an alternative embodiment, the tabs 302 may be on the side support connector 104 and the tab receivers 304 may be on the side support frame 102.

In an alternative embodiment, other connection systems, such as a support bar extending from the side support frames 102, glue, etc., may be used to connect the side support frame connector 104 to the side support frames 102.

In an alternative embodiment, side support frames 102 do not have cross side supports 106.

Figure 4:
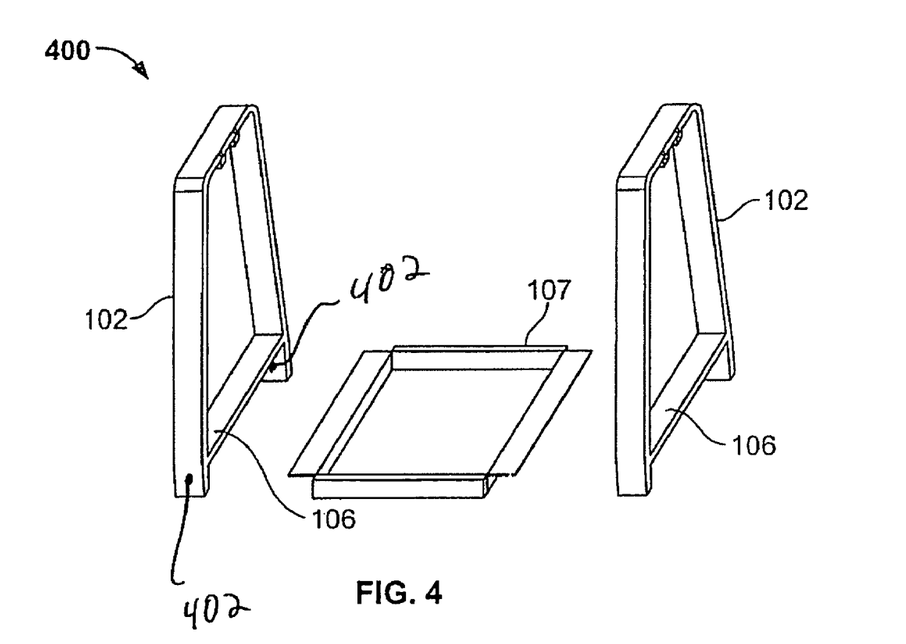
FIG. 4 is an exploded view of two side support frames and a base support frame positioned in accordance with an embodiment of the present invention.

FIG. 4 is an exploded view of the two side support frames 102 and the base support frame 107 positioned in accordance with an embodiment of the present invention. In FIG. 4, the cross side supports 106 are welded to the side support frames 102. The base support frame 107 is positioned relative to the side support frames 102 in preparation for positioning the base support frame 107 on the cross side supports 106 and in contact with the side support frames 102.

In an alternative embodiment, other fastening systems, such as tabs and tab receivers, threaded bolt and nuts sets, etc., may be used to connect the cross side supports 106 to the side support frames 102.

In an alternative embodiment, cross side supports 106 may be tabs that extend from the side support frames 102.

Figure 5:
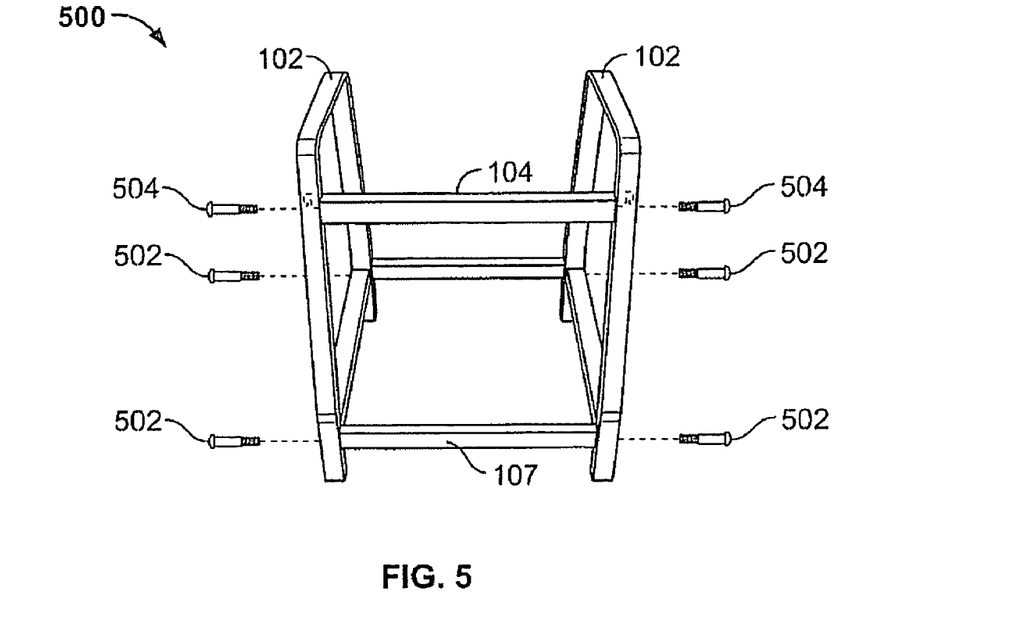
FIG. 5 is a perspective view of two side support frames, a side support frame connector, and a base support frame positioned in accordance with an embodiment of the present invention.

FIG. 5 is a perspective view of two side support frames 102, a side support frame connector 104, and a base support frame 107 positioned in accordance with an embodiment of the present invention. In FIG. 5, the side support frame connector 104 is positioned in position to be secured to the side support frames 102 using threaded bolts 504 that pass through holes in the side support frames 102 and screw into pre-threaded holes (not shown) in the side support frame connector 104. The base support frame 107 is positioned in position to be secured to the side support frames 102 using threaded bolts 50 that pass through holes in the side support frames 102 and screw into pre-threaded holes (not shown) in the base support frame 107.

In an alternative embodiment, other fastening systems, such as threaded bolt and nut sets, etc., may be used to secure the side support frame connector 104 to the side support frames 102.

In an alternative embodiment, other fastening systems, such as threaded bolt and nut sets, etc., may be used to secure the base support frame 107 to the side support frames 102.

In an alternative embodiment, the base support frame 107 may be connected to the cross side supports 106 as well as or in lieu of the side support frame 102.

FIG. 6 is an exploded view of a side support frame 102 and a side shelf 108 used in accordance with an embodiment of the present invention. In FIG. 6, the side shelf 108 has side shelf support tabs 602 and the side support frame 102 has side shelf support tab apertures 601. The side shelf 108 is connectable to the side support frame 102 by inserting the side shelf support tabs 602 into the side shelf support tab apertures 601. In FIG. 6, the side shelf 108 is substantially perpendicular to the side support frame 102.

In an alternative embodiment, the side shelf support tabs 602 may be on the side support frame 102 and the side shelf support tab apertures 601 may be on the side shelves 108.

In an alternative embodiment, other connection systems, such as a mating slot and a flange set, etc., may be used to connect the side shelf 108 to the side support frame 102.

FIG. 7 is an exploded view of the side shelf support tab 602 and the side shelf support tab aperture 601 shown in FIG. 6. In FIG. 7, the side shelf support tab 602 and the corresponding side shelf support tab aperture 601 are rectangular in shape. In an alternative embodiment, the side shelf support tab 602 and the corresponding side shelf support tab aperture 601 may take on other shapes, such as circular, hexagonal, triangular, etc.

FIG. 8 is an exploded view of a side support frame 106, a side shelf 108, and a bowl 110 used in accordance with an embodiment of the present invention. In FIG. 8, the bowl 110 and the side shelf 108 are secured to the side support frames 102 using a threaded bolt and nut system 806. As shown in FIG. 8, a threaded bolt 806 passes through a hole 803 in the side of the bowl 110. The bolt 806 then passes through a hole 802 in the side support frame 102 and a hole (not shown) in the side shelf 108. Once the bolt 806 passes through all the holes, a nut 806 is screwed onto the bolt 806 to secure the bowl 110 and the side shelf 108 to the side support frame 102.

In an alternative embodiment, separate fastening systems may be used to secure the bowl 110 and the side shelf 108 to the side support frame 102.

In an alternative embodiment, other fastening systems, such as clamps, screws, glue, etc., may be used to connect the side shelf 108 to the side support frame 102.

In an alternative embodiment, other fastening systems, such as clamps, screws, glue, etc., may be used to connect the bowl 110 to the side support frame 102.

Figure 9:
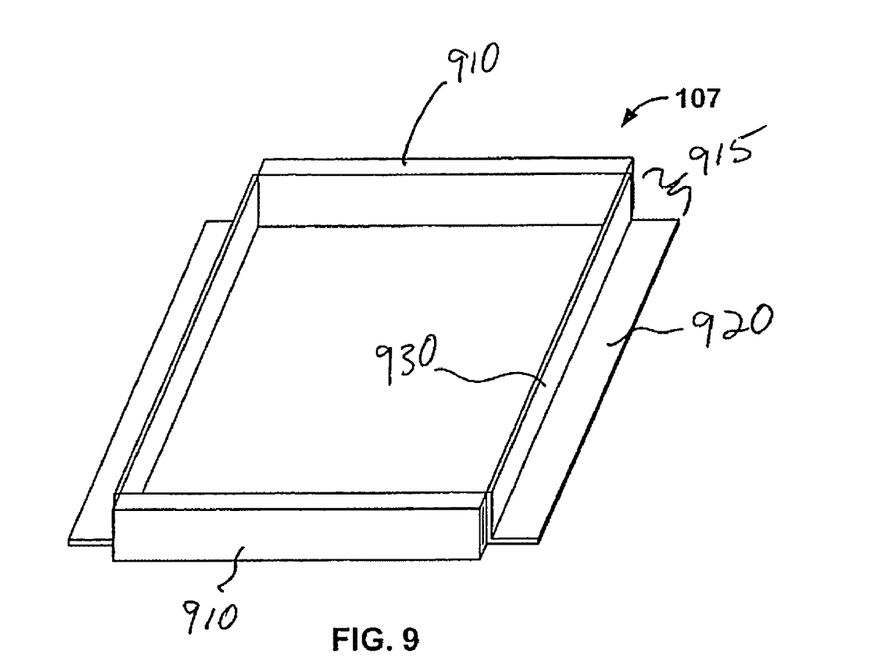
FIG. 9 is bottom view of a base support frame used in accordance with an embodiment of the present invention.

FIG. 9 is a bottom view of a preferred embodiment of a base support frame 107 used in accordance with an embodiment of the present invention. The base support frame 107 includes two cross supports 910 and two side supports 915. Each side support 915 includes a horizontal side support frame rest 920 and a vertical side support frame rest 930.

The base support frame 107 is preferably generally rectilinear. The cross supports 910 form two opposing sides of the base support frame 107 and the side supports 915 form the other two opposing sides. Each cross support 910 is joined to both side supports 915. That is, one end of each cross support 910 is attached or joined to one of the side supports 915, for example, by welding, and the other end of the cross support 910 is attached or joined to the other side support 915. Similarly, each side support 915 is attached or joined to both cross supports 910. That is, one end of each side support 915 is attached or joined to one of the cross supports 910 and the other end of the side support 915 is attached or joined to the other cross support 910. The cross supports 910 and the side supports 915 are preferably attached or joined by welding the cross supports 910 to the side supports 915.

In operation, as shown above with regard to FIGS. 1 and 5 and further described below with regard to FIGS. 10 and 11, the base support frame 107 is positioned relative to the side support frames 102 to assist in positioning the side support frames 102 and in constructing the grill.

In an alternative embodiment, other general shapes, such as circular, triangular, hexagonal, etc., may be used for the base support frame 107.

In an alternative embodiment, other connection systems, such as tabs and tab receivers, mating slots and flanges, threaded bolt and nut sets, etc., may be used to connect the cross supports 910 and side supports 915.

In an alternative embodiment, the side supports 915 may not include vertical side support frame rests 930. In such an embodiment, the side support frame rest 920 may still rest on top of the cross side support 106 and the cross support 910 may contact the side support frame 102.

In an alternative embodiment, the side supports 915 may not run the entire length of the cross side support 106. In such an embodiment, the base support frame 107 may be two separate members, each including a cross support 910 and two side supports 915 that do not run the entire length of the cross side support 106.

Figure 10:
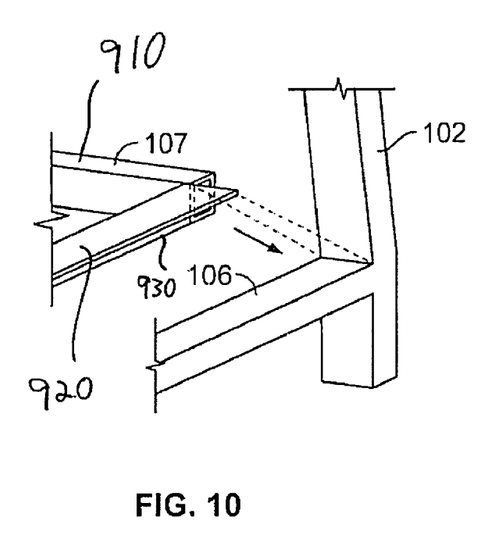
FIG. 10 is an exploded view of a side support frame, a cross side support, and a base support frame used in accordance with an embodiment of the present invention.

FIG. 10 is an exploded view of a side support frame 102, a cross side support 106, and a base support frame 107 in accordance with an embodiment of the present invention. As shown in FIG. 10, the base support frame 107 is in a position to be positioned on top of the cross side support 106 and in contact with the side support frame 102. The positioning of the base support frame 107 on top of the cross side support 106 and in contact with the side support frame 102 is described with respect to FIG. 11.

Figure 11:
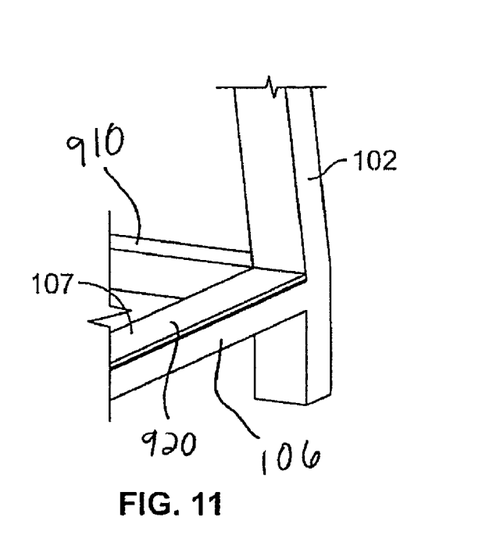
FIG. 11 is a perspective view of a side support frame, a cross side support, and a base support frame used in accordance with an embodiment of the present invention.

FIG. 11 is a perspective view of a side support frame 102, a cross side support 106, and a base support frame 107 used in accordance with an embodiment of the present invention. As shown, the base support frame 107 is positioned on top of the cross side support 106 and in contact with the side support frame 102.

With regard to the position of the base support frame 107 on top of the cross side support 106, the lower horizontal surface of the horizontal side support frame rest 920 contacts the upper horizontal surface of the cross side support 106. Further, the vertical surface of the vertical side support frame rest 930 that is oriented toward the exterior of the grill contacts the vertical surface of the cross side support 106 that is oriented toward the interior of the grill.

With regard to the contact between the base support frame 107 and the side support frame 102, the vertical surface of the horizontal side support frame rest 920 contacts the vertical surface of the side support frame 102 that also contacts the cross side support 106. Further, the vertical surface of the cross support 910 contacts the vertical surface of the side support frame 102 that is oriented toward the interior of the grill.

In operation, the base support frame 107 is positioned relative to the side support frames 102 to assist in positioning the side support frames 102 and in constructing grills.

The grill including a quick assembly system has thus far been described with regard to the embodiments shown in FIGS. 1-11. However, it should be noted that, while FIGS. 1-11 were drafted with the intention of showing the elements of the grill in as much detail as possible, the elements depicted in the Figures are not necessarily to scale or in proportion for the embodiment shown in FIG. 1. Additionally, the scale and proportion may be varied to accommodate grills of different sizes.

In alternative embodiments, elements may be in different scale or proportion than the elements depicted in FIGS. 1-11. Further, in an alternative embodiment, a grill may include all of the parts described above or a subset of the parts described above.

In an alternative embodiment, one or more of the fastening systems and connection systems may be configured to allow parts of the grill to be connected, secured, and/or attached without using tools. For example, threaded bolt and nut sets may include wing nuts that may be actuated by a user.

Assembling the grill using the quick assembly system shown in FIGS. 1-11 is now described according to a preferred embodiment.

First, as shown in more detail in FIG. 3, two side support frames 102 with pre-welded cross side supports 106 are positioned vertically on a horizontal surface. The side support frames 102 are positioned substantially parallel to each other and substantially perpendicular to the horizontal surface. Thus, the cross side supports 106 are substantially parallel to the horizontal surface.

Second, as shown in more detail in FIG. 3, the side support frames 102 are connected to a side support frame connector 104 by introducing tabs 306 on the side support frames 102 into tab receivers 304 in the side support frame connector 104. After this step, the side support frame connector 104 is connected to the side support frames 102 so that the side support frame connector 104 is positioned substantially parallel to the horizontal surface.

Third, as shown in more detail in FIG. 4, the base support frame 107 is positioned on top of the cross side supports 106 and between the side support frames 102. After this step, the base support frame is positioned substantially parallel to the horizontal surface.

Fourth, as shown in more detail in FIG. 5, the side support frame connector 104 is secured to the side support frames 102 using bolts 502 that screw into pre-threaded holes in the side support frame connector 104. The base support frame 107 is secured to the side support frames 102 using bolts 504 that screw into pre-threaded holes in the base support frame 107. After this step, the side support frame connector 104 and the base support frame 107 are secured to the side support frames 102.

Fifth, the wheels 118 are attached to one of the side support frames 102 by passing a threaded axle (not shown) through holes 402 in the lower end of the side support frame 102 and then securing the wheels 118 to the axle with nuts. After this step, the wheels 118 are connected to one of the side support frames 102.

Sixth, hubcaps 202 are connected to the wheels 118 by pushing pins (not shown) that protrude from the hub cap 202 through holes (not shown) in the wheels 118. After this step, the hubcaps 202 are connected to the wheels 118.

Seventh, leg extensions 120 are attached to the end portions of the side support frame 102 that is not connected to the wheels 118. After this step, the leg extensions 120 are connected to the end portions of the side support frame 102 that is not connected to the wheels 118.

Eighth, as shown in more detail in FIGS. 6 and 7, the side shelves 108 are connected to the side support frames 102 by introducing side shelf support tabs 602 on the side shelves 108 into side shelf support tab receivers 601 on the side support frames 102. After this step, the side shelves 108 are connected to the side support frames 102.

Ninth, as shown in more detail in FIG. 8, the bowl 110 is positioned between the side support frames 102, and both the bowl 110 and the side shelves 108 are secured to the side support frames 102 using threaded bolt and nut sets 806 that pass through holes in the bowl 803, the side support frames 802 and the side shelves (not shown). After this step, the side shelves 108 and the bowl 110 are secured to the side support frames 102.

Tenth, the bottom half of the hinge (not shown) is attached to the bowl 110 using a threaded bolt and nut set (not shown) that passes through holes in the back side of the bowl 110. After this step, the bottom half of the hinge is attached to the bowl 110.

Eleventh, the top half of the hinge (not shown) is attached to the lid 112 using a threaded bolt and nut set (not shown) that passes through holes in the back side of the lid 112. After this step, the top half of the hinge is attached to the lid 112.

Twelfth, the lid 112 is placed on top of the bowl 110 and holes in the top and bottom halves of the hinge are aligned so that a threaded bolt may be passed through the holes and secured by a nut to create an axis about which the lid 112 may be pivoted between a closed position (see FIG. 1) and open positions (not shown). After this step, the lid 112 is pivotally attached to the bowl 110.

Thirteenth, the vent 114 is attached to the lid 112 using threaded bolt and nut sets (not shown). After this step, the vent 114 is attached to the lid 112.

Fourteenth, a handle 116 is attached to the lid 112 using threaded bolt and nut sets (not shown). After this step, the handle 116 is attached to the lid 112.

Fifteenth, the charcoal grate 204 is positioned in a lower portion of the bowl 110. After this step, the charcoal grate 204 is positioned in the bowl 110

Sixteenth, grate height adjusters 205 are positioned in the bowl 110 on the charcoal grate 204. After this step, the grate height adjusters 205 are positioned in the bowl 110.

Seventeenth, the cooking grate 206 is positioned in an upper portion of the bowl 110 on the grate height adjusters 205. After this step, the cooking grate 206 is positioned in the bowl 110.

Eighteenth, the warming rack 208 is attached to the bowl 110 and the lid 112. After this step, the warming rack 208 is attached to the bowl 110 and the lid 112.

Nineteenth, the bottom shelf 109 is positioned on the base support frame 107. After this step, the bottom shelf 109 is positioned on the base support frame 107.

Twentieth, the ash catcher 111 is positioned underneath the bowl 110. After this step, the ash catcher 111 is positioned underneath the bowl 110.

In alternative embodiments, some or all of the assembly steps employing some or all of the parts may be conducted in the same and/or different sequences. Additionally, other elements may be included or elements may be eliminated. For example, two more wheels 118 may be added to the grill in place of the leg extensions 120. Further, as mentioned above, in alternative embodiments, elements may be in different scale or proportion than the elements depicted in FIGS. 1-11.

While the invention has been described with reference to embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A grill including:
   a first side support frame including a first cross side support positioned parallel to the surface supporting the grill, wherein said first cross side support includes a first top surface and a first lateral surface, wherein said first side support frame includes a plurality of vertical supports and said first cross side support extends between said plurality of vertical supports;
   a second side support frame including a second cross side support positioned parallel to the surface supporting the grill, wherein said second cross side support includes a second top surface and a second lateral surface, wherein said second side support frame includes a plurality of vertical supports and said second cross side support extends between said plurality of vertical supports; and
   a rectilinear base support frame, wherein said base support frame includes:
      a first base side having a first horizontal side support frame rest and a first vertical side support frame rest;
      a second base side having a second horizontal side support frame rest and a second vertical side support frame rest;
      a third base side; and
      a fourth base side,
   wherein said first base side is oriented toward said first side support frame and said second base side is oriented toward said second side support frame,
   wherein said base support frame is positioned so that said first horizontal side support frame rest rests on top of said first top surface of said first side support frame and said second horizontal side support frame rest rests on top of said second top surface of said second side support frame,
   wherein said first vertical side support frame rest abuts said first lateral surface of said first side support frame and said second vertical side support frame rest abuts said second lateral surface of said second side support frame
   wherein at least one of said first vertical side support frame rest and said second vertical side support frame rest extends as a solid strip of material for substantially the entire length of its respective cross side support,
   wherein at least one of said first horizontal side support frame rest and said second horizontal side support frame rest extends as a solid strip of material for substantially the entire length of its respective cross side support,
   wherein said third base side and said fourth base side of said base support frame do not include a vertical side support frame rest and do not include a horizontal side support frame rest,
   wherein said rectilinear base support frame includes an opening between said base sides.

2. The grill of claim 1 wherein at least one of said first horizontal side support frame rest and said first vertical side support frame rest is coextensive with said first cross side support.

3. The grill of claim 1 wherein each of said side support frames includes a tab extending from said side support frames, wherein said tabs accept a side support frame connector to connect said side support frames.

4. The grill of claim 1 wherein at least one of said side support frames further includes a shelf support tab aperture to accept a side shelf support tab of a side shelf.

5. A method for assembling a grill including:
   positioning a first side support frame including a first cross side support positioned parallel to a surface supporting the grill, wherein said first cross side support includes a first top surface and a first lateral surface, wherein said first side support frame includes a plurality of vertical supports and said first cross side support extends between said plurality of vertical supports;
   positioning a second side support frame including a second cross side support positioned parallel to the surface supporting the grill, wherein said second cross side support includes a second top surface and a second lateral surface, wherein said second side support frame includes a plurality of vertical supports and said second cross side support extends between said plurality of vertical supports; and positioning a rectilinear base support frame, wherein said base support frame includes;
   a first base side having a first horizontal side support frame rest and a first vertical side support frame rest;
   a second base side having a second horizontal side support frame rest and a second vertical side support frame rest;
   a third base side; and
   a fourth base side,
wherein said first base side is oriented toward said first side support frame and said second base side is oriented toward said second side support frame,
wherein said base support frame is positioned so that said first horizontal side support frame rest rests on top of said first top surface of said first side support frame and said second horizontal side support frame rest rests on top of said second top surface of said second side support frame,
wherein said first vertical side support frame rest contacts said first lateral surface of said first side support frame and said second vertical side support frame rest contacts said second lateral surface of said second side support frame,
wherein at least one of said first vertical side support frame rest and said second vertical side support frame rest extends as a solid strip of material for substantially the entire length of its respective cross side support,
wherein at least one of said first horizontal side support frame rest and said second horizontal side support frame rest extends as a solid strip of material for substantially the entire length of its respective cross side support,
wherein said third base side and said fourth base side of said base support frame do not include a vertical side support frame rest and do not include a horizontal side support frame rest,
wherein said rectilinear base support frame includes an opening between said base sides.

* * * * *